United States Patent
Thompson

(10) Patent No.: US 12,144,466 B2
(45) Date of Patent: Nov. 19, 2024

(54) RESILIENT SCOOP

(71) Applicant: Helen of Troy Limited, St. Michael (BB)

(72) Inventor: Luke Thompson, New York, NY (US)

(73) Assignee: HELEN OF TROY LIMITED, St. Michael (BB)

( * ) Notice: Subject to any disclaimer, the term of this patent is extended or adjusted under 35 U.S.C. 154(b) by 295 days.

(21) Appl. No.: 17/717,430

(22) Filed: Apr. 11, 2022

(65) Prior Publication Data
US 2023/0320533 A1    Oct. 12, 2023

(51) Int. Cl.
*A47J 43/28*     (2006.01)
*A47G 21/04*    (2006.01)

(52) U.S. Cl.
CPC .......... *A47J 43/281* (2013.01); *A47G 21/04* (2013.01)

(58) Field of Classification Search
CPC ........ A47J 42/281; A47J 43/282; A47J 21/04; A47J 43/281; A63B 23/032; A63B 21/021; A63B 2022/0092; A61H 23/004; A61H 2205/02; A61H 2201/165; A61H 2201/1604
USPC ..... 30/324; 425/92, 276, 279, 283; 219/725, 219/730, 757, 759; 294/55; D7/681, D7/646, 691, 692; 249/69, 70, 120, 121, 249/126, 127, 128.203, 136, 137
See application file for complete search history.

(56) References Cited

U.S. PATENT DOCUMENTS

| 2,053,711 | A | * | 9/1936 | Glomb | ...................... F25C 1/24 249/120 |
| 2,295,847 | A | | 9/1942 | Hume | |
| 2,774,226 | A | * | 12/1956 | Schweller | ................. F25C 1/24 249/70 |

(Continued)

FOREIGN PATENT DOCUMENTS

| DE | 202019104205 | 9/2019 |
| EP | 1 371 314 | 12/2003 |

(Continued)

OTHER PUBLICATIONS

Mrs. Fields Silicone Scoop; https://www.amazon.com/Mrs-Fields-Silicone-Scoop-Cookie/dp/B00F9LGQ3K, [online], publicly available prior to Apr. 6, 2022. [Retrieved from the Internet Apr. 6, 2022].

(Continued)

*Primary Examiner* — Ghassem Alie
(74) *Attorney, Agent, or Firm* — RANKIN, HILL & CLARK LLP

(57) ABSTRACT

A resilient scoop includes a handle and a rim. A bowl has an open end portion secured to the rim. The bowl is movable relative to the rim between a first, unbuckled condition and a second, buckled condition, where in the second condition the bowl is biased back toward the first condition. The bowl includes a base wall and a sidewall that extends from the base wall to the open end portion. The sidewall includes a smooth inner surface and an outer surface. The sidewall is configured such that a stiffness of the sidewall is less than a stiffness of the base wall. The sidewall resists movement of the bowl toward the second condition until an input force applied to the base wall is equal to or greater than a threshold reaction force of the sidewall directed toward the base wall.

15 Claims, 14 Drawing Sheets

(56) References Cited

U.S. PATENT DOCUMENTS

| | | | |
|---|---|---|---|
| 3,358,619 A * | 12/1967 | Pareira | A47J 43/282 |
| | | | D7/681 |
| 3,844,525 A * | 10/1974 | Parmett | F25C 1/243 |
| | | | 229/406 |
| 4,076,207 A * | 2/1978 | Austin | A47J 43/20 |
| | | | D7/672 |
| 6,453,562 B1 | 9/2002 | Hakim | |
| 6,467,175 B2 | 10/2002 | Bohm-Van Diggelen | |
| 6,701,625 B1 | 3/2004 | Thomason | |
| 6,851,574 B1 | 2/2005 | Traynor | |
| 8,529,974 B2 * | 9/2013 | Ortiz | B65D 77/0493 |
| | | | 426/115 |
| 10,029,144 B2 * | 7/2018 | Noguchi | A63B 23/032 |
| 10,238,238 B1 * | 3/2019 | Rayis | A47J 43/20 |
| 2004/0134079 A1 | 7/2004 | Lion | |

FOREIGN PATENT DOCUMENTS

| | | |
|---|---|---|
| GB | 2319461 | 5/1998 |
| JP | 2015000306 | 1/2015 |
| KR | 20080108958 | 12/2008 |
| WO | 2007145646 | 12/2007 |

OTHER PUBLICATIONS

Ice Cream Scoop, 2 pcs Nonstick Anti-Freeze food grade, https://www.amazon.com/Nonstick-Anti-Freeze-Scooper-Comfortable-Dishwasher/dp/B081VQ9W1G, [online], publicly available prior to Apr. 6, 2022. [Retrieved from the Internet Apr. 6, 2022].
International Search Report and the Written Opinion issued in PCT/US23/13598 dated Apr. 24, 2023.

* cited by examiner

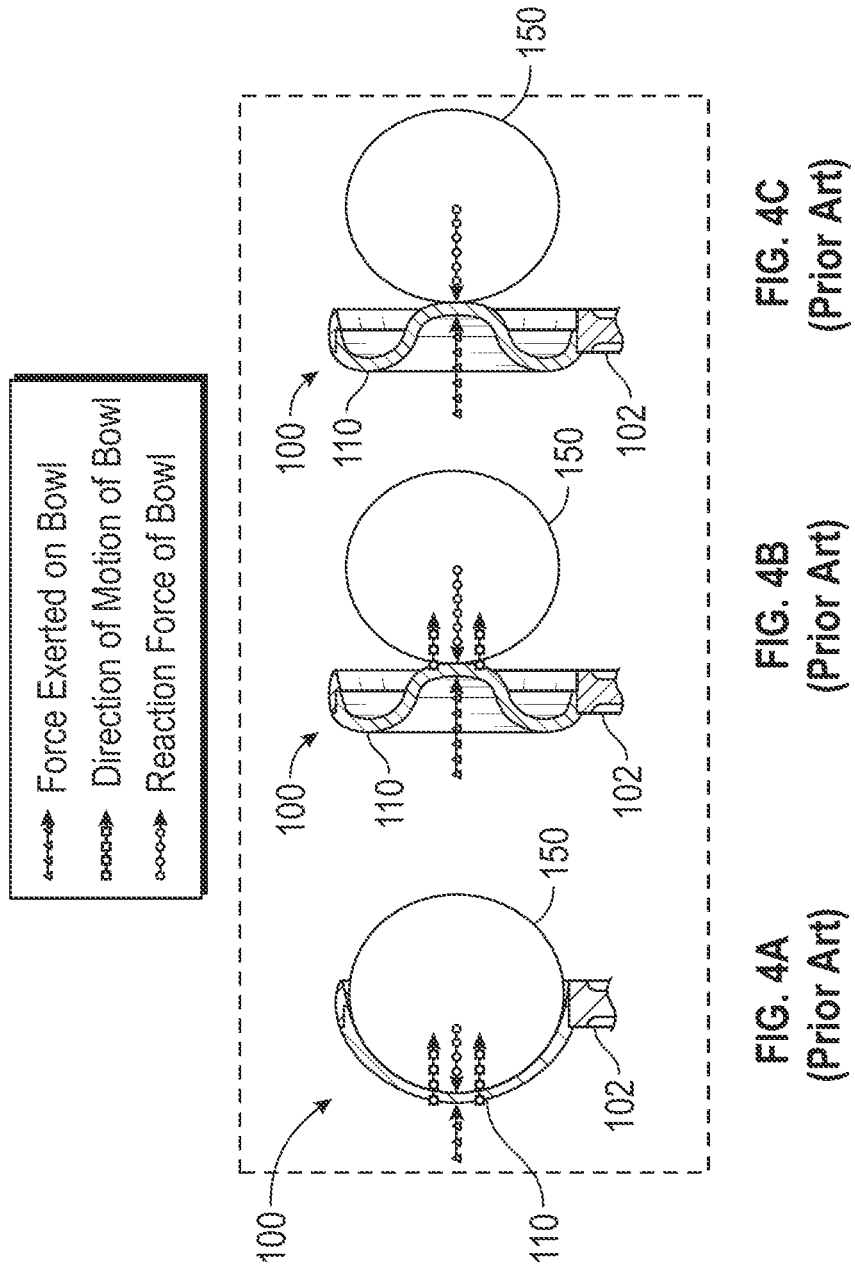

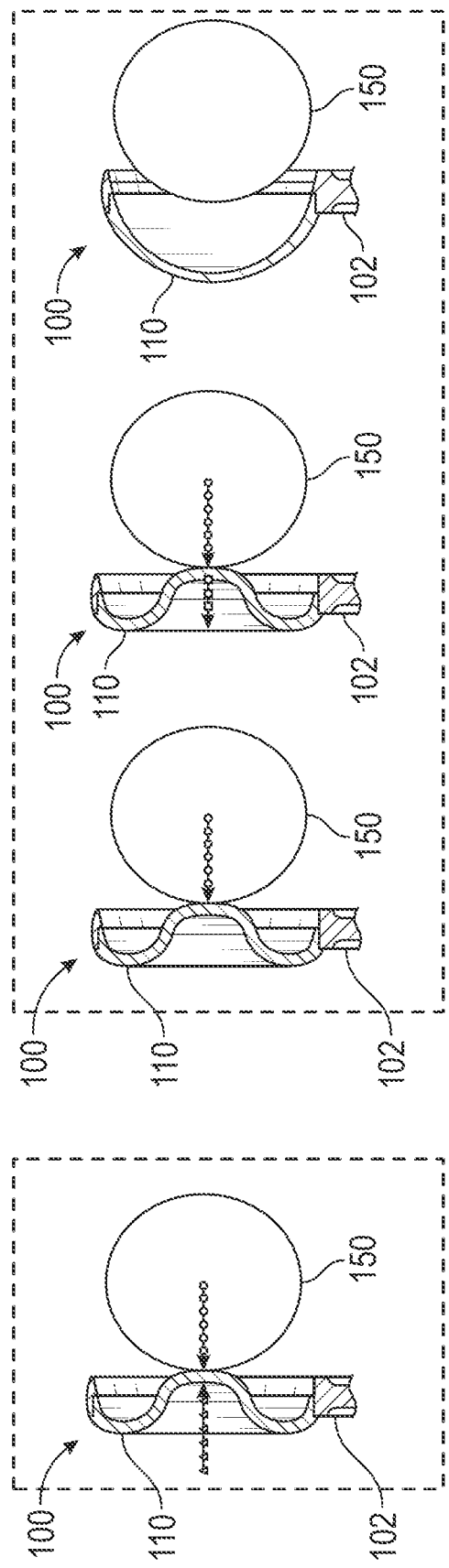

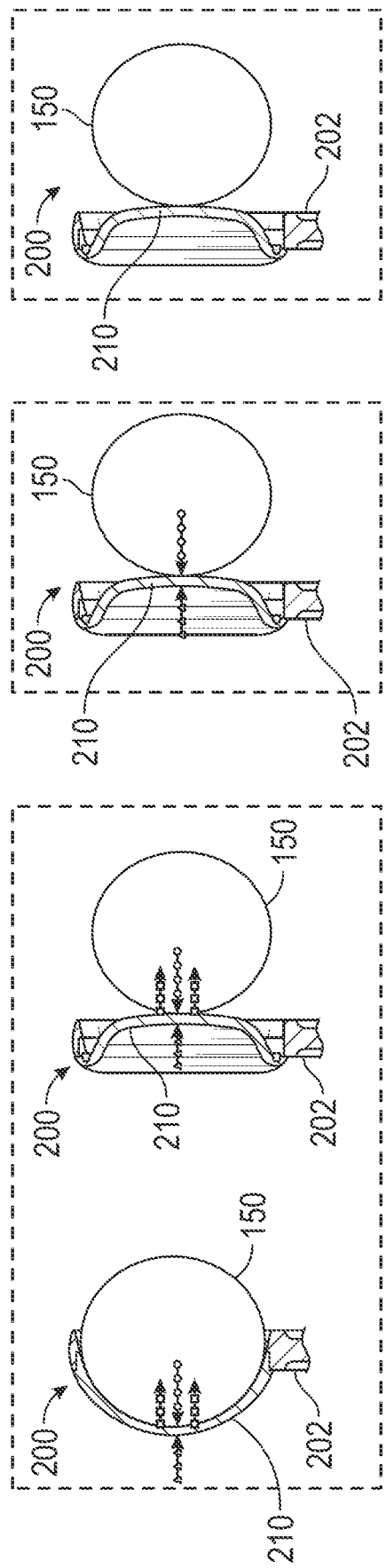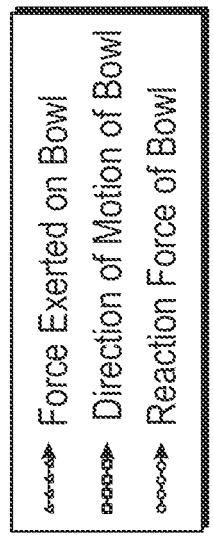

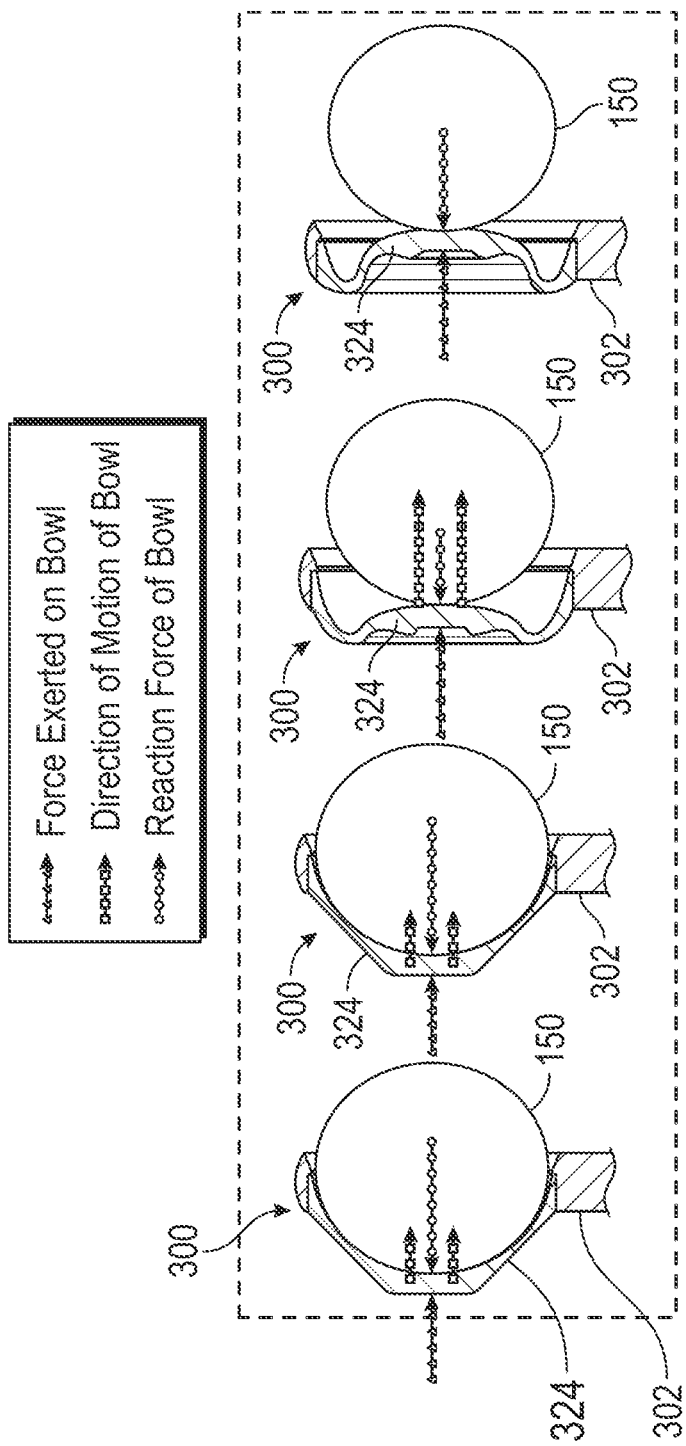

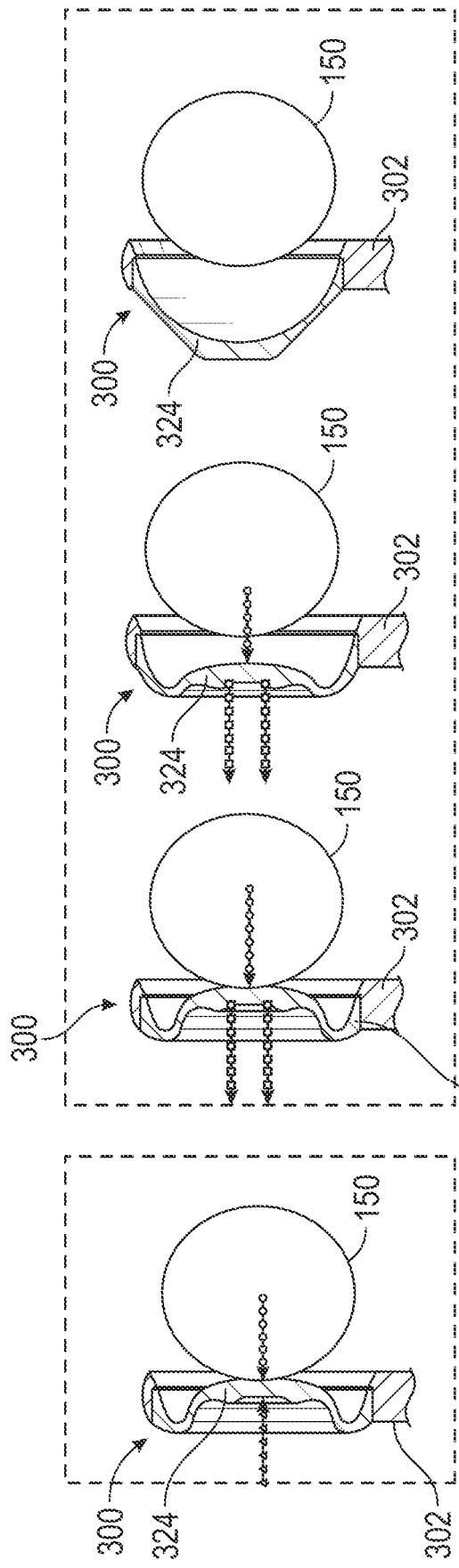

RESILIENT SCOOP

BACKGROUND

When depositing amounts or dollops of cookie dough onto a cookie sheet prior to baking, it is usually desirable to make the amounts of dough deposited on the sheet uniform so that the resulting cookies are about the same size. Typically, an individual simply uses hand separation perhaps with a spoon and visual estimation of size to deposit individual dough dollops upon a cookie sheet. Commonly, cookie dough adheres to dispensing tools making it difficult to separate the dough from the tool and effectively aggravating the problem of depositing uniform dough dollops onto a cookie sheet. Hand-operated scoops are known dispensing tools that enable one to deposit about the same amount of cookie dough for each cookie from a dough batch onto a cookie sheet. The known scoop generally includes a handle and a resilient, elastic bowl connected to the handle, the bowl being compressible to enable one to separate the dough from the scoop for direct deposit upon a cookie sheet.

SUMMARY

According to one aspect, a scoop comprises a handle having a proximal end portion and a distal end portion opposite the proximal end portion. A rim is secured to the distal end portion. The rim has an outer surface and an inner surface opposite the outer surface, the inner surface defining an opening extended through the rim. A bowl has an open end portion secured to the rim. The bowl is movable relative to the rim between a first, unbuckled condition and a second, buckled condition, where in the second condition the bowl is biased back toward the first condition. The bowl includes a base wall and a sidewall that extends from the base wall to the open end portion. The sidewall includes a smooth inner surface and an outer surface. The sidewall is configured such that a stiffness of the sidewall is less than a stiffness of the base wall. The sidewall resists movement of the bowl toward the second condition until an input force applied to the base wall is equal to or greater than a threshold reaction force of the sidewall directed toward the base wall.

According to another aspect, a scoop comprises a rim having an outer surface and an inner surface opposite the outer surface, the inner surface defining an opening extended through the rim. A bowl formed of a resilient, elastic material has an open end portion secured to the rim. A connection between the open end portion of the bowl and the inner surface of the rim defines a hinge portion adapted to allow for movement of the bowl relative to the rim between a first, unbuckled condition and a second, buckled condition. The bowl includes a sidewall and a base wall, the sidewall is configured to resist movement of the bowl toward the second condition until an input force applied directly to the base wall is equal to or greater than a threshold reaction force of the sidewall directed toward the base wall. The sidewall is configured such that continued application of the input force equal to or greater than the threshold reaction force maintains the bowl the second condition. The sidewall is configured such that removal of the input force from the base wall results in an increasing impulse imparted onto the bowl in a direction of the first condition due to combined reaction forces of the sidewall and the base wall.

BRIEF DESCRIPTION OF THE DRAWINGS

FIGS. 4a, 4b and 4c illustrate a glob of cookie dough being removed from the bowl of the known scoop of FIG. 1 via a user input force applied to the bowl in the first condition and displacing the bowl toward the second condition.

FIG. 5 illustrates a transition period of the bowl depicted in FIG. 4c.

FIGS. 6a, 6b and 6c illustrate the bowl of FIG. 5 in the second condition returning the first condition via removal of a user input force, the glob of cookie dough ejected from the scoop.

FIGS. 10a and 10b illustrate a glob of cookie dough being removed from the bowl of the known scoop of FIG. 7 via a user input force applied to the bowl in the first condition and displacing the bowl toward the second condition.

FIG. 11 illustrates a transition period of the bowl depicted in FIG. 10b.

FIG. 12 illustrates the bowl of FIG. 11 maintained in the second condition upon removal of a user input force, the glob of cookie dough ejected from the scoop.

FIGS. 24a, 24b, 24c and 24d illustrate a glob of cookie dough being removed from the bowl of the scoop of FIGS. 13 and 14 via a user input force applied to the bowl in the first condition and displacing the bowl toward the second condition.

FIG. 25 illustrates a transition period of the bowl depicted in FIG. 24d.

FIGS. 26a, 26b and 26c illustrate the bowl of FIG. 25 in the second condition returning the first condition via removal of a user input force, the glob of cookie dough ejected from the scoop.

DETAILED DESCRIPTION

It should, of course, be understood that the description and drawings herein are merely illustrative and that various modifications and changes can be made in the structures disclosed without departing from the present disclosure. Spatially relative terms may be used to describe an element and/or feature's relationship to another element(s) and/or feature(s) as, for example, illustrated in the figures. It will be understood that the spatially relative terms are intended to encompass different orientations of the resilient scoop in use and/or operation in addition to the orientation depicted in the figures. Any term of degree used herein, such as "substantially," means a reasonable amount of deviation of the modified word is contemplated such that the end result is not significantly changed. Moreover, the term "thickness" used herein is a distance measured approximately perpendicular to inner and outer contact surfaces of the defined component.

Figure 1:
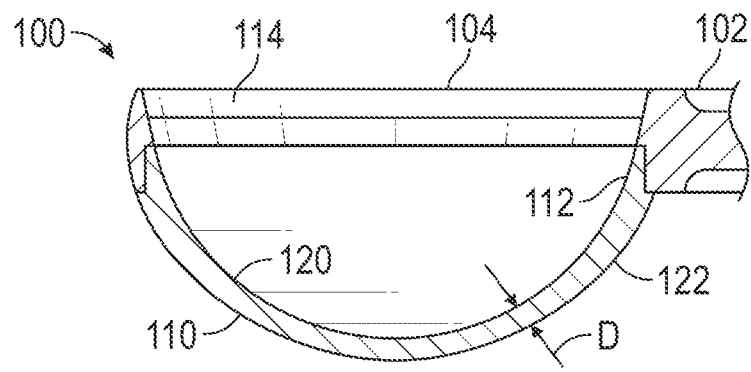
FIG. 1 is partial cross-sectional view of a known scoop including a bowl connected to a rim of a handle, the bowl shown in a first, undeformed/undepressed condition.
Figure 2:
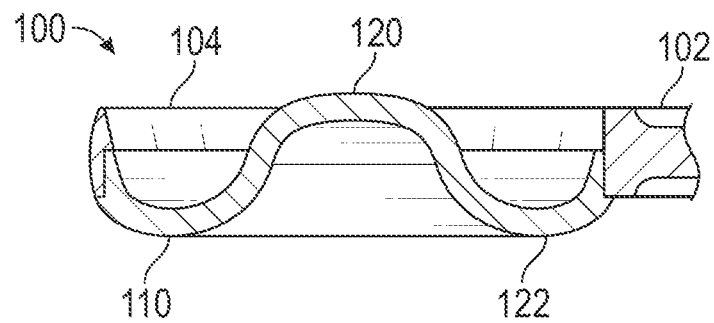
FIG. 2 is a partial cross-sectional view of the known scoop of FIG. 1, with the bowl shown in a second, deformed/depressed condition.

Referring now to the drawings, wherein like numerals refer to like parts throughout the several views, FIG. 1 is a partial cross-sectional view of a known scoop 100 for depositing cookie dough onto a cookie sheet. The scoop 100 includes a handle 102 and a substantially circular scooping rim 104 connected to the handle. A hemispherical shaped bowl 110 formed of a resilient, elastic material has an open end portion 112 secured to an inner surface 114 of the rim 104. In cross-section, the bowl 110 includes a smooth inner surface 120 and a smooth outer surface 122, and has a substantially constant, uniform thickness dimension D. The bowl 110 is movable relative to the rim 104 between a first, undeformed/undepressed condition (FIG. 1) where the bowl 110 has a depth and is capable of holding cookie dough and a second, deformed/depressed condition (FIG. 2) where a lower portion of the bowl is folded into an upper portion; and as a result, the cookie dough is pushed out of the bowl and onto a cookie sheet.

Figure 3:
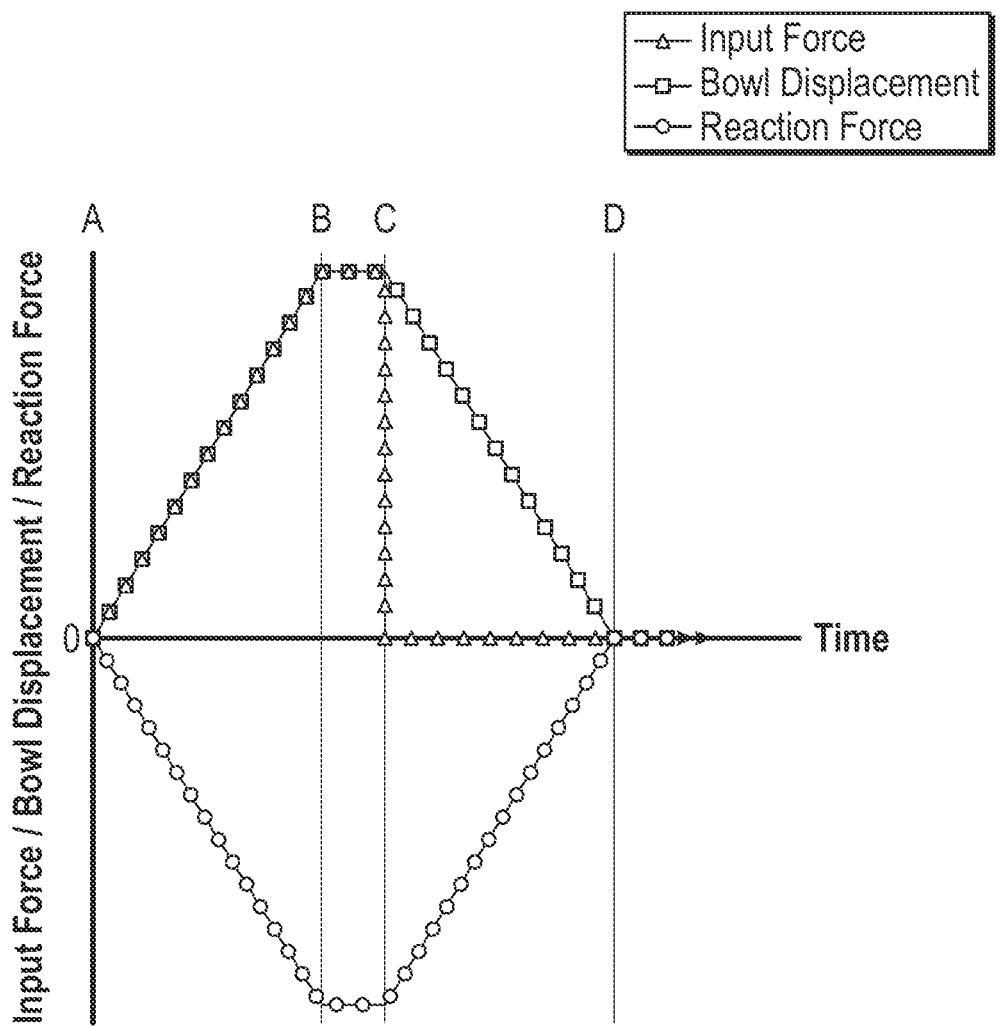
FIG. 3 graphically illustrates input force on bowl versus time, displacement of bowl versus time, and reaction force of bowl versus time of the known scoop of FIG. 1 as the bowl is displaced between the first condition and the second condition.

The known bowl 110 with the substantially constant, uniform thickness dimension is an "analogue" design meaning that there is no critical input force required to move the bowl toward the second condition. Instead, the input force required to depress the bowl 110 toward the second condition (i.e., displacement of the bowl) is only equal to an elastic force of the bowl material. This is best illustrated in FIG. 3 which graphically illustrates user input force on the bowl 110 versus time, displacement of the bowl 110 versus time, and reaction force of bowl 110 versus time as the bowl is displaced between the first condition and the second condition. And further illustrated in FIGS. 4a, 4b, 4c, 5, 6a, 6b and 6c is a glob of cookie dough 150 being removed from the bowl 110 of the known scoop 100. With the known scoop 100, a user input force applied to the bowl 110 in the first condition (FIG. 4a, line A of FIG. 3) displaces the bowl from the first condition toward the second condition (FIG. 4b, line B of FIG. 3), where during displacement of the bowl 110 (FIG. 4b, line A to line B of FIG. 3) reaction force of the bowl is equal in magnitude to user input force and the bowl is displaced at substantially the same speed as the user's finger pressing the bowl. With the user maintaining the bowl 110 in the second condition (FIG. 5), input force is equal to reaction force (line B to Line C of FIG. 3). The user then removes the input force to eject the glob of cookie dough (FIG. 6a, line C of FIG. 3). The bowl 110 returns to the first condition as a result of its own material elastic reaction force (FIG. 6b to FIG. 6c, line C to line D of FIG. 3). In FIG. 6c, the bowl 110 is returned to the first condition, and the glob of cookie dough 150 is ejected from the scoop 100 only if the user quickly exerted enough input force on the bowl 110. Therefore, the bowl 110 can be depressed at any position, at any velocity, and can be stable (if held with the required input force) at any degree of depression. Upon removal of the input force, the bowl is biased back to the first condition. With this known configuration of the bowl 110, a user "smushes" the dough out of the bowl at whatever velocity and force the user exerts, which may lead to poor results in sticky substances.

Figure 7:
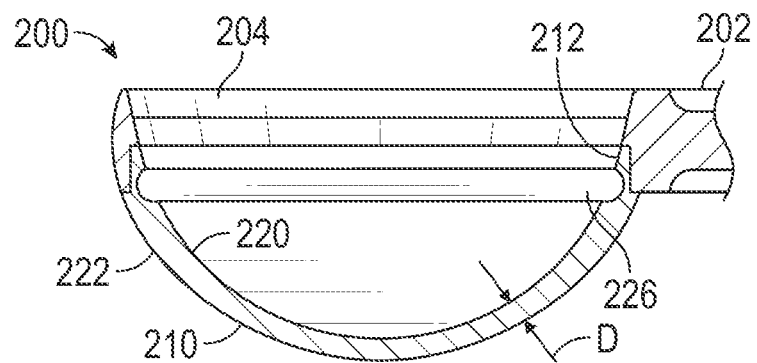
FIG. 7 is partial cross-sectional view of another known scoop including a bowl connected to a rim of a handle, the bowl shown in a first, unbuckled condition.
Figure 8:
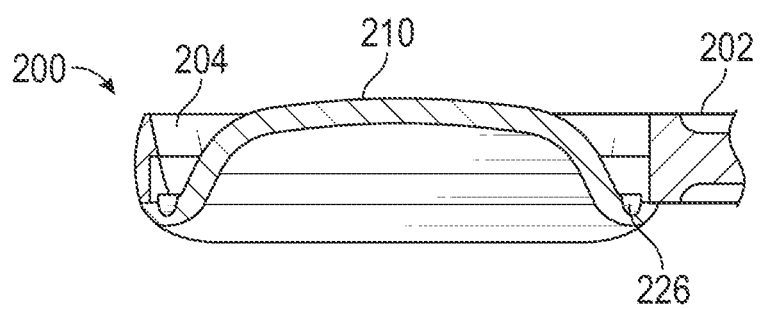
FIG. 8 is a partial cross-sectional view of the known scoop of FIG. 7, with the bowl shown in a second, buckled condition.

FIG. 7 is a partial cross-sectional view of another known scoop 200 for depositing cookie dough onto a cookie sheet. The scoop 200 includes a handle 202 and a substantially circular scooping rim 204 connected to the handle. A hemispherical shaped bowl 210 formed of a resilient, elastic material has an open end portion 212 secured to an inner surface 214 of the rim 204. In cross-section, the bowl 210 includes a smooth inner surface 220 and a smooth outer surface 222, and has a substantially constant, uniform thickness dimension D. An annular groove or channel 226 is formed on the inner surface, at the connected open end portion 212 of the bowl. Similar to the bowl 110 of the known scoop 100, the bowl 210 is movable relative to the rim 204 between a first, unbuckled condition (FIG. 7) where the bowl has a depth and is capable of holding cookie dough and a second, buckled condition (FIG. 8) where a lower portion of the bowl is folded into an upper portion; and as a result, the cookie dough is pushed out of the bowl onto a cookie sheet.

However, the bowl 210 with the groove 226 is a "collapsing" design meaning that the bowl 210 is "bi-stable" in the sense that the bowl can stay at the second condition without any input force being applied to the bowl. This is achieved by the groove 226 that acts as a relief to the elastic force of the bowl material and allows the bowl to reorient itself in the stable second condition. It should be appreciated that in lieu of the groove, the bowl can have an oversized depth dimension (i.e., as measured from the rim 204 to a bottom of the bowl 210) that allows the bowl to double back on itself so that a hinged or bend area of the bowl is stable (i.e., elastic forces on either side of the hinged or bend area are equal). With the scoop 200, an input force applied to the bowl 210 increases until the input force equals or exceed a threshold reaction force of the bowl, where a constant input force is then needed to displace the bowl into the second condition Because the bowl 210 is stable in the second condition, there is no input force required to maintain the bowl in the second condition as is required with the "analogue" design of the bowl 110.

Figure 9:
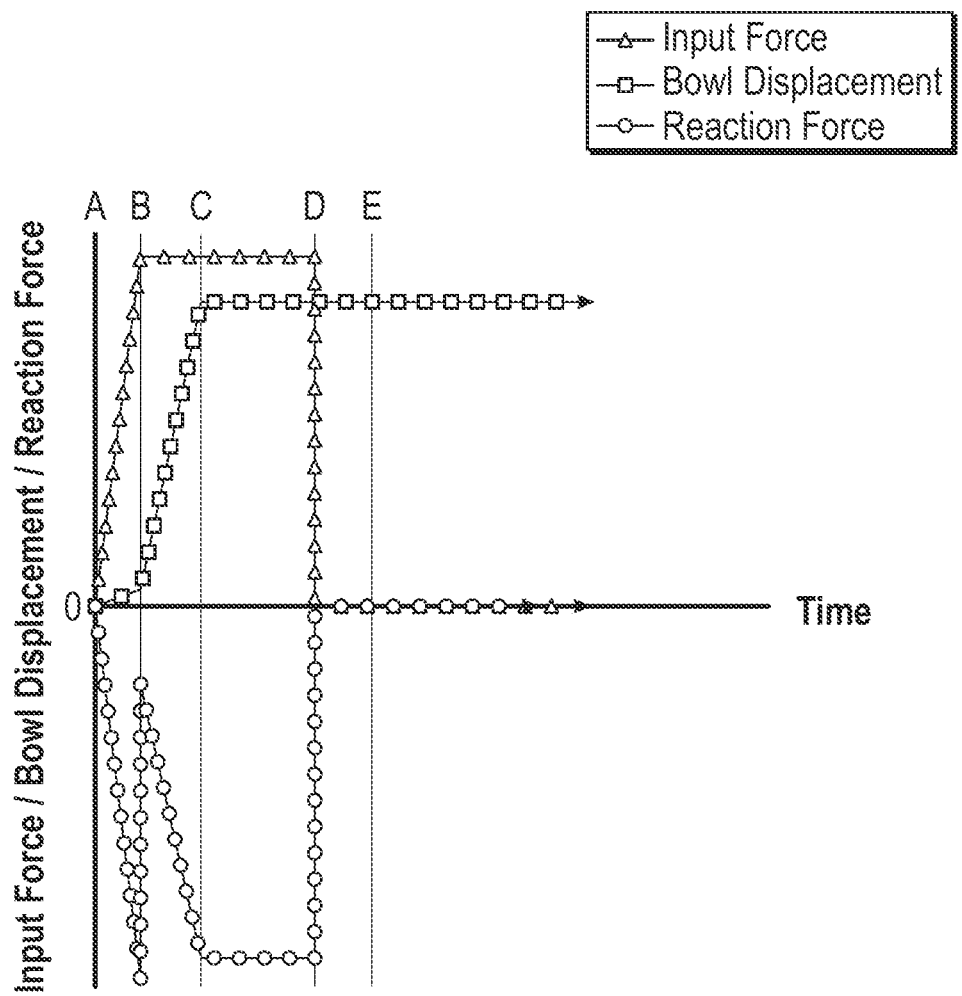
FIG. 9 graphically illustrates input force on bowl versus time, displacement of bowl versus time, and reaction force of bowl versus time of the known scoop of FIG. 7 as the bowl is displaced between the first condition and the second condition.
Figure 13:
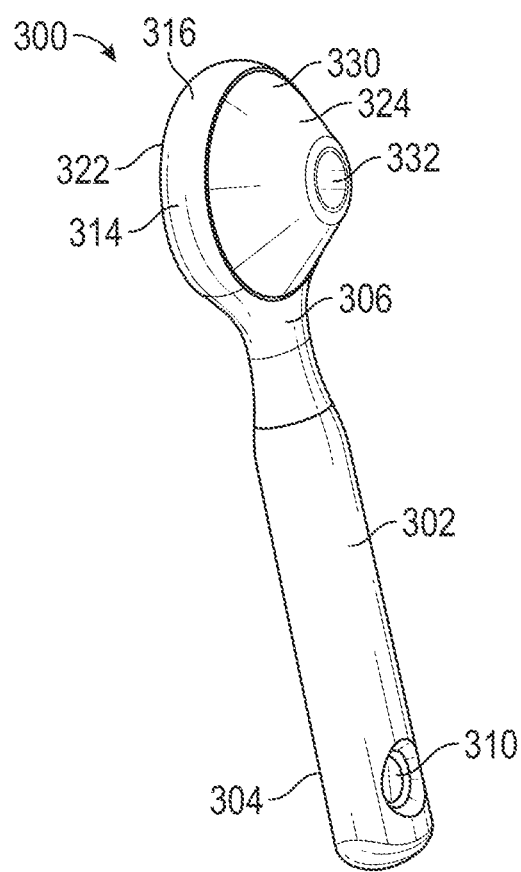
FIGS. 13 and 14 are perspective views of a scoop according to the present disclosure, the scoop including a bowl connected to a rim of a handle, the bowl shown in a first, unbuckled condition.
Figure 14:
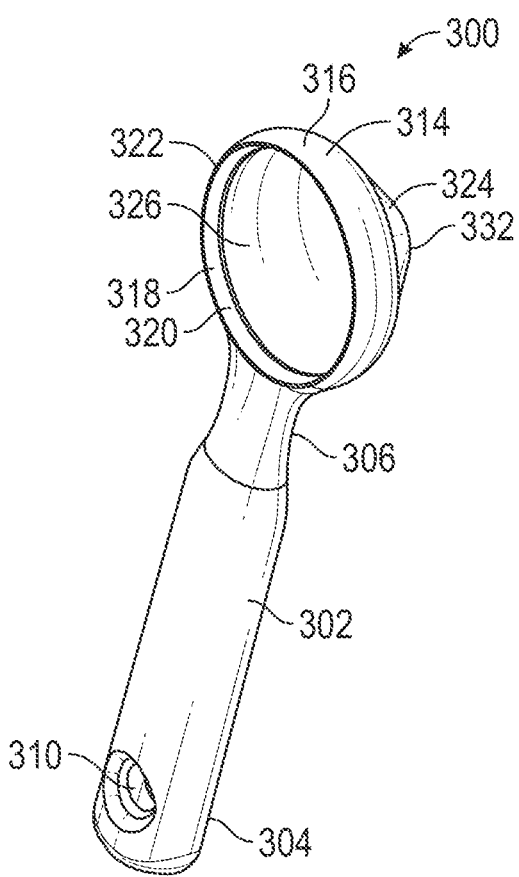
Figure 15:
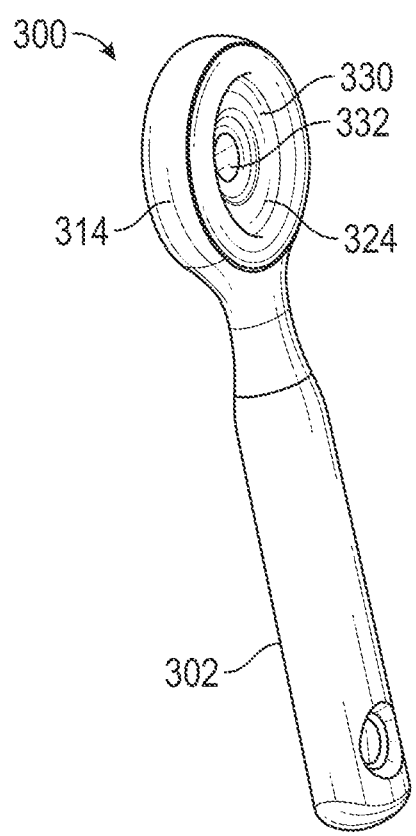
FIGS. 15 and 16 are perspective views of the scoop of FIG. 13, with the bowl shown in a second, unbuckled condition.
Figure 16:
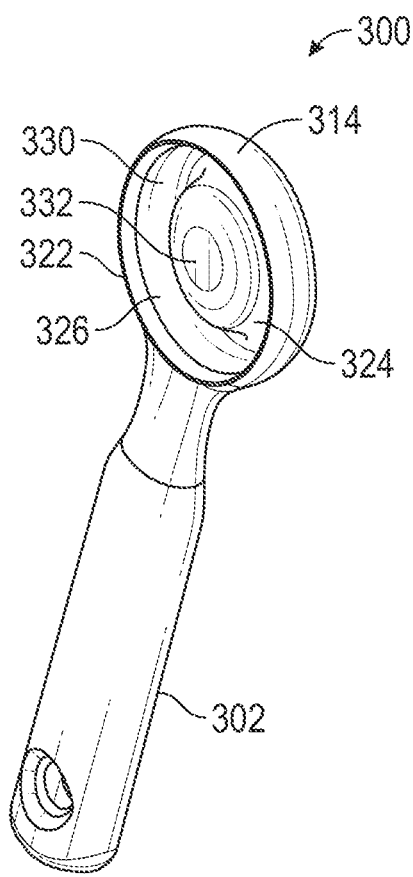

This is best illustrated in FIG. 9 which graphically illustrates user input force on the bowl 210 versus time, displacement of the bowl 210 versus time, and reaction force of bowl 210 versus time as the bowl is displaced between the first condition and the second condition. And further illustrated in FIGS. 10a, 10b, 11 and 12 is a glob of cookie dough 150 being removed from the bowl 210 of the known scoop 200. With the known scoop 200, an increasing user input force is applied to the bowl 210 in the first condition, and a reaction force of the bowl equal in magnitude to the increasing user input force prevents the bowl from buckling (FIG. 10a, line A to line B of FIG. 9). When the user input force equals or exceed a threshold reaction force of the bowl 210 (line B of FIG. 9), the bowl 210 buckles allowing displacement of the bowl to the second condition (FIG. 10b, line B to line C of FIG. 9). A constant input force is then needed to displace the bowl into the second condition (FIG. 11, line C to line D of FIG. 9), where during displacement of the bowl 210 reaction force of the bowl is equal in magnitude to user input force. With the bowl 210 in the second condition (FIG. 11), input force is equal to reaction force (line C to line D of FIG. 9). The user then removes the input force, removing the reaction force, and the glob of cookie dough is ejected (FIG. 12, line D to line E of FIG. 9). The bowl 210 is stable in the second condition and is maintained in the second condition (FIG. 12, line D to line E of FIG. 9). Therefore, the bowl 210 can be depressed at any position, at any velocity to overcome the threshold reaction force, and can then be moved under a constant input force to the second condition where the bowl is stable. With this known configuration of the bowl 210, a user "smushes" the dough out of the bowl at whatever velocity and force the user exerts which again may lead to poor results in sticky substances, and because the bowl is maintained at the second condition, the user is required to forcibly move the bowl back to the first condition which can be an inconvenience to the user.

FIGS. 13-16 depict a resilient scoop 300 according to the present disclosure for depositing, for example, cookie dough on a cookie sheet. The scoop 300 includes a handle 302 having a proximal end portion 304 and a distal end portion 306 opposite the proximal end portion. An opening 310 can extend though the proximal end portion, allowing the scoop 300 to be hung from, for example, a kitchen hook. A rim 314 is secured to the handle distal end portion 306. The rim 314 has an outer surface 316 and an inner surface 318 opposite the outer surface, the inner surface defining an opening 320 extended through the rim. In the depicted aspect, the rim 314 can be provided with a beveled outer edge 322 to create a cutting surface. A resilient bowl 324 has an open end portion 326 secured to the rim 314, specifically the inner surface 318 of the rim, and has a selected depth for holding food (i.e., cookie dough) or other edible products. As shown, the rim 314 assumes a generally circular configuration such that the bowl is hemispherical shaped. However, the rim could be any other desirable shape, for example, a generally oval configuration.

In the example shown, the handle 302 and the rim 314 are made of rigid material (e.g., a thermoplastic material), and a compressible material (e.g., silicone) can cover part of the handle 302 for grip. The bowl 324 can be made of various materials. In some embodiments the bowl would comprise a stretchable diaphragm or a pliable membrane or a piece of flexible rubber, silicone, or other elastic material. In any event, the bowl 324 is designed such that the bowl can move relative to the rim 314 between a first, unbuckled condition (FIGS. 13 and 14) where the bowl 324 has a depth and is capable of holding cookie dough and a second, buckled condition (FIGS. 15 and 16) where a lower portion of the bowl is folded into an upper portion; and as a result, the space within the bowl 324 is compressed and the cookie dough is pushed out of the bowl onto, for example, a cookie sheet. Similar to the "analogue" design described above, the bowl 314 is configured such that in the second condition the bowl is biased back toward the first condition.

Figure 17:
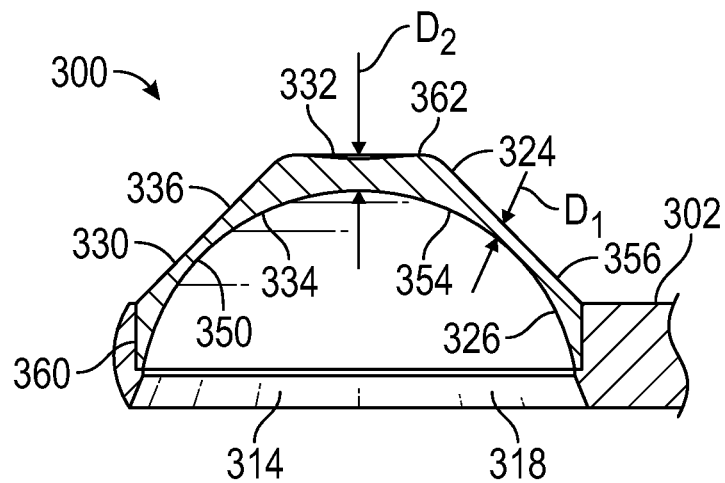
FIG. 17 is a partial cross-sectional view of FIG. 13 or FIG. 14.

With particular reference to FIG. 17, the bowl 324 includes a sidewall 330 and a base wall 332. The sidewall 330 includes a substantially smooth inner surface 334 and a substantially smooth outer surface 336 that is opposite the inner surface. In the present aspect, an entirety of the inner surface 334 is smooth and an entirety of the outer surface 336 is smooth. According to the present disclosure, and in contrast to the known scoop designs described above where the bowl 110, 210 was of a substantially constant thickness, the bowl 324 defines sections of varying thicknesses. Specifically, the sidewall 330 defines a reduced thickness section 350 having a thickness $D_1$. The base wall 332 which is centered in a bottom of the bowl 324 defines a thickness $D_2$. The thickness $D_1$ of the reduced thickness section 350 of the sidewall 330 is less than the thickness $D_2$ of the base wall 332. To form this reduced thickness section 350 and in view of the curved shape of the inner surface 334, a curvature of the outer surface 336 deviates from a curvature of the inner surface. By way of example, the outer surface 336 of the sidewall in cross-section of the bowl 324 can be straight or inwardly curved toward the inner surface. Further, in the depicted aspect the reduced thickness section 350 of the sidewall is centrally located between the rim 314 and the base wall 332. With this location, the sidewall includes a first section 354 interconnecting the reduced thickness section 350 and the base wall 332 and a second section 356 interconnecting the reduced thickness section 350 and the open end portion 326 of the bowl 324. In the cross-section of FIG. 17, each of the first section 354 and the second section 356 has an increasing thickness along a direction from the reduced thickness section 350 toward the respective base wall 332 and the open end portion 326. Therefore, the exemplary scoop 300 has three components of varying stiffnesses, the rigid rim 314, the sidewall 330, and the base wall 332 of the bowl 324, where the stiffness is directly proportional to the both the cross-sectional area of the component and the elastic modulus of the component—which is related to the component's material.

Figure 18:
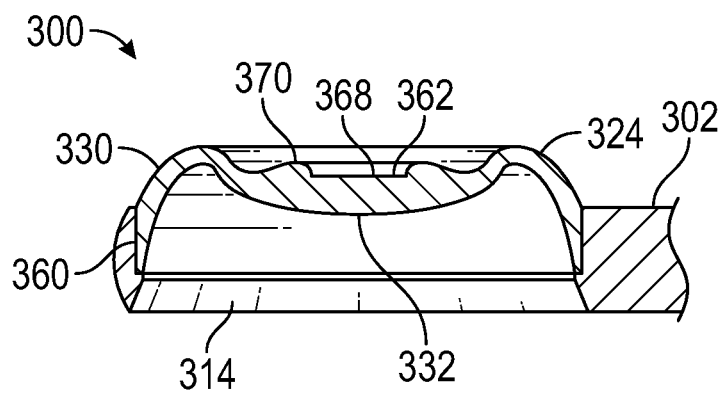
FIG. 18 is a partial cross-sectional view of the scoop of FIG. 13, with the bowl shown in an intermediate condition.
Figure 19:
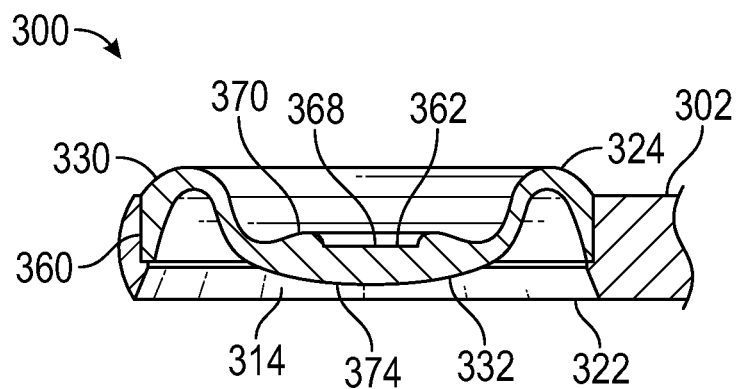
FIG. 19 is a partial cross-sectional view of FIG. 15 or FIG. 16.

As indicated previously, the bowl 324 can be made of various materials. In FIGS. 17-19, the bowl 324 is formed from a unitary, one piece resilient, elastic material (e.g., silicone), where a connection 360 between the open end portion 326 of the bowl and the inner surface 318 of the rim 314 defines a hinge portion for the movement of the bowl between the first, unbuckled condition (FIG. 17), an intermediate condition (FIG. 18), and the second, buckled condition (FIG. 19). An outer surface 362 of the base wall 332 in the first condition of the bowl is substantially planar and defines a support surface for the bowl 324. Because of the resilient, elastic material of the bowl 324, an input force applied to the outer surface 362 of the base wall in the intermediate condition and the second condition inwardly deforms the outer surface 362 to define a recess 368 and a ridge 370 surrounding the recess. Further, in FIG. 19 the sidewall 330 is configured such that in the second condition of the bowl an inner surface 374 of the base wall 332 is located at or beneath the outer edge 322 of the rim 314.

Figure 20:
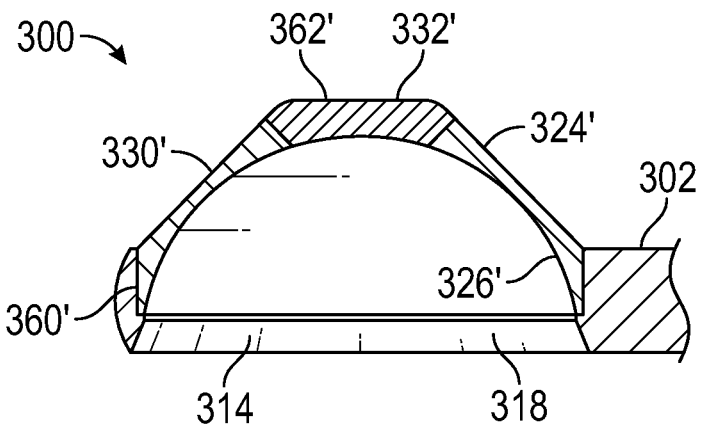
FIG. 20 is partial cross-sectional view of a scoop according to another aspect of the present disclosure, the scoop including a bowl connected to a rim of a handle, the bowl shown in a first, unbuckled condition.
Figure 21:
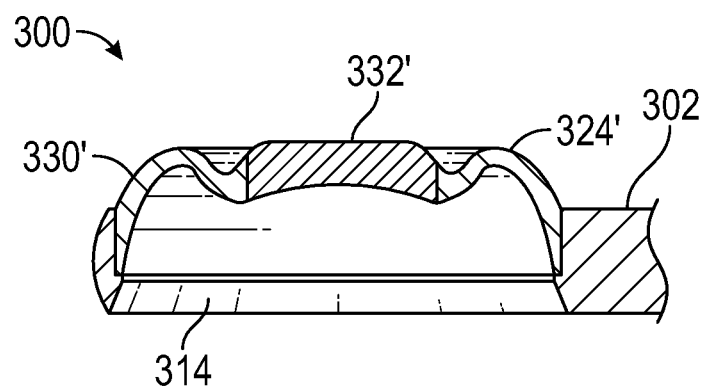
FIG. 21 is a partial cross-sectional view of the scoop of FIG. 20, with the bowl shown in an intermediate condition.
Figure 22:
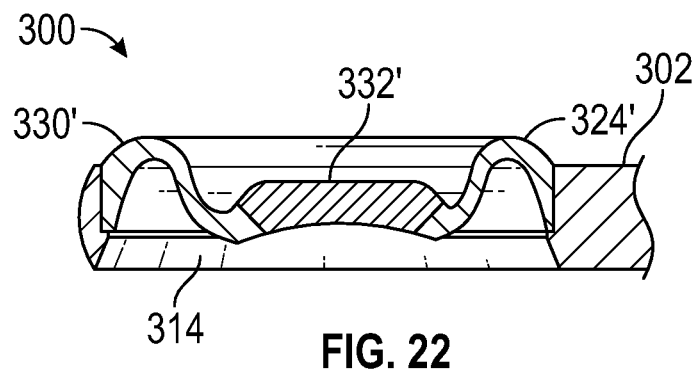
FIG. 22 is a partial cross-sectional view of the scoop of FIG. 20, with the bowl shown in a second, buckled condition.

FIGS. 20-22 depict an alternative aspect of a bowl 324' for the scoop 300. According to this aspect, and similar to the above described bowl 324, a sidewall 330' of the bowl 324' is formed of a resilient, elastic first material (e.g., silicone). However, a base wall 332' of the bowl 324' is formed of a second material having a hardness greater than a hardness of the first material (e.g., a thermoplastic material, a metal, a hard durometer silicone, etc.). It should be appreciated that with this aspect of the bowl 324' where the sidewall 330' and base wall 332' are formed of different materials, it is not necessary for the sidewall 330' to have a reduced thickness section and the base wall 332' to have an increased thickness relative to the sidewall 330' as depicted because of the difference in material stiffness between the sidewall 330' and the base wall 332' can achieve the desired characteristics of the bowl described hereafter. Again, a connection 360' between an open end portion 326' of the bowl and the inner surface 318 of the rim 314 defines a hinge portion for the movement of the bowl 324' between the first, unbuckled condition (FIG. 20), an intermediate condition (FIG. 21), and the second, buckled condition (FIG. 22). An outer surface 362' of the base wall 332' in the first condition of the bowl is substantially planar and defines a support surface for the bowl 324'; however, the material of the base wall 332' prevents the deformation of the base wall upon an input force. In both aspects of the bowl 324, 324', the hinge portion defined by the connection 360, 360' is adapted to bias the bowl from the second condition back toward the first condition.

The exemplary bowl 324, 324' of the scoop 300 is of a "digital" design that incorporates the above described geometry and/or material in the sidewall 330, 330' and the base wall 332, 332' to only deform at a set force requirement at which point the bowl 324, 324' will buckle/collapse to the second condition more instantaneously and snap back release quickly to the first condition upon removal on an input force. The impulse created by the initial buckling and subsequent snap back breaks the stiction with the cookie dough or other substance in the bowl 324, 324' and separates the cookie dough from the inner surface of the bowl onto a cookie sheet. The "digital" design of the bowl 324, 324' uses a stiffness change in the bowl (provided by, for example, the reduced thickness section 350 of bowl 324 or the differing materials of bowl 324') to create the buckling/impulse effect.

More particularly, with the configuration of the sidewall 330 described above, a stiffness of the sidewall 330 in the reduced thickness section 350 is less than a stiffness of the base wall 332. As such, the sidewall 330 is configured as a rigid beam that temporarily resists movement of the bowl 324 from the first condition (FIG. 17) toward the second condition (FIG. 19) until an input force applied to the base wall 332 is equal to or greater than a threshold reaction force of the sidewall 330 directed toward the base wall. The input force increases until the input force equals or exceed the threshold reaction force and the bowl 324 is moved to the intermediate condition (FIG. 18). A constant input force is then needed to displace the bowl from the intermediate condition into the second condition (FIG. 19). It should be appreciated that in contrast to the known scoop designs described above where the bowl 110, 210 was of a substantially constant thickness and could be buckled via an input force applied to either the sidewall or the base wall of the bowl 110, 210, the sidewall 330 of the bowl 324 with the varying thickness is configured to prevent movement of the bowl 324 from the first condition toward the second condition upon an input force applied substantially normal to the reduced thickness section 350 of the sidewall 330. In the intermediate condition (FIG. 18), the reaction force normal to the input force is very low allowing the bowl 324 to move very quickly to the second condition (FIG. 20) until the elastic force of the bowl exceeds that of the input force. At that displacement, the bowl is temporarily stable (buckled), the sidewall 330 of the bowl 324 being configured such that continued application of the input force equal to or greater than the threshold reaction force maintains the bowl the second condition. Once the input force is removed, the reaction force of sidewall 330 snaps the bowl 324 back into the first, unbuckled condition. The snap back is amplified by the short length of the sidewall 330 and by the elastic forces of both the base wall 324 and the connection 360 at the rim 314. It should be appreciated that the bowl 324' behaves in a similar manner. Therefore, the scoop 300 performs more conveniently than the known scoops 100, 200 in the depositing of cookie dough onto a cooking sheet.

Figure 23:
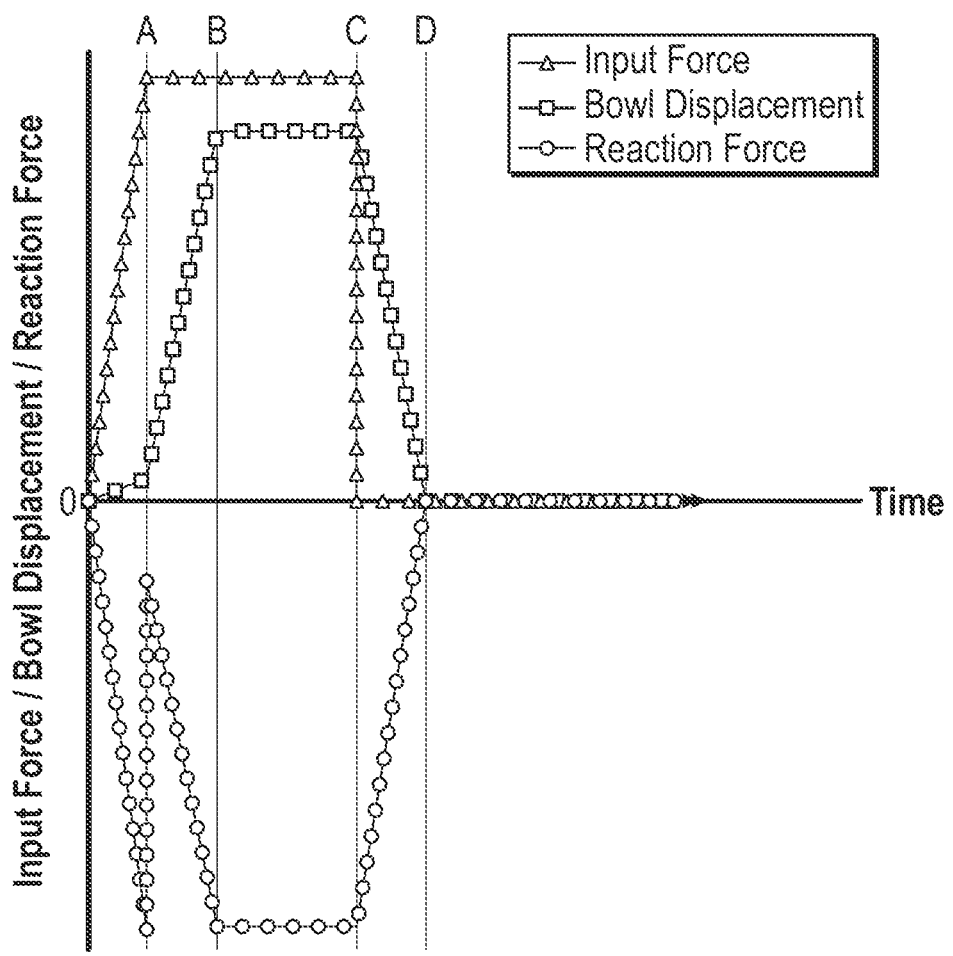
FIG. 23 graphically illustrates Input Force on Bowl versus time, Displacement of Bowl versus time, and Reaction Force of Bowl versus time the scoop of FIG. 13 and FIG. 20 as the bowl is displaced between the first condition and the second condition.

The above features of the scoop 300 are best illustrated in FIG. 23 which graphically illustrates user input force on the bowl 324 versus time, displacement of the bowl 324 versus time, and reaction force of bowl 324 versus time as the bowl is displaced between the first condition and the second condition. And further illustrated in FIGS. 24a, 24b, 24c, 24d, 25, 26a, 26b and 26c is a glob of cookie dough 150 being removed from the bowl 324. With the scoop 300, an increasing user input force is applied to the bowl 324 in the first condition, and a reaction force of the bowl 324 equal in magnitude to the increasing user input force prevents the bowl from buckling (FIG. 24a, point 0 to line A of FIG. 23). It should be appreciated that the sidewall 330 is configured to resist movement of the bowl 324 to the second condition, and therefore, increasing the input force results in little deformation of the bowl 324 since the sidewall 330 is resisting movement (sidewall 330 acting as a rigid beam). When the use input force applied directly to the base wall 332 is equal to or greater than a threshold reaction force of the sidewall 330 directed toward the base wall (FIG. 24b, line A of FIG. 23), the bowl 324 buckles allowing displacement of the bowl to the second condition (FIG. 24c, line A to line B of FIG. 23). Once the sidewall buckles, the bowl 324 moves very quickly to the second condition with no additional force (high input force, very low reaction force). The sidewall 330 is configured such that continued application of the input force equal to or greater than the threshold reaction force maintains the bowl the second condition (FIG. 24d, line B to line C of FIG. 23). And a constant input force equal to reaction force is then needed to hold the bowl 324 in the second condition (FIG. 25)

The sidewall 330 is configured such that removal of the input force from the base wall 332 results in a large impulse of the bowl 324 towards the first condition due to the combined spring (reaction) forces of the sidewall 330 and the base wall 332 acting without resistance (FIG. 26a to FIG. 26b, line C to line D of FIG. 23). It should be appreciated that releasing the bowl 324 (no input force) results in the bowl 324 snapping back to the first condition very quickly due to the unstable state of the second condition. The reaction force is high (in comparison to an "analogue" geometry in the second condition) due to the combined spring forces of the base wall 332 stretching the sidewall 330 and vice versa. The base wall 332 has a higher spring constant than the sidewall 330 and the impulse generated creates this quick movement. In FIG. 26c, the bowl 324 is returned to the first condition, and the glob of cookie dough 150 is ejected from the scoop 300.

It will be appreciated that the above-disclosed embodiments and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A scoop comprising:
a handle having a proximal end portion and a distal end portion opposite the proximal end portion;
a rim secured to the distal end portion, the rim having an outer surface and an inner surface opposite the outer surface, the inner surface defining an opening extended through the rim; and
a bowl having an open end portion secured the inner surface of the rim, the bowl is movable relative to the rim between a first, unbuckled condition and a second, buckled condition, where in the second condition the bowl is biased back toward the first condition,
wherein the bowl includes a base wall and a sidewall that extends from the base wall to the open end portion, the sidewall includes a smooth inner surface and an outer surface, wherein the sidewall is configured such that in the second condition an inner surface of the base wall is located at or beneath an outer edge of the rim,
wherein the sidewall is configured such that a stiffness of the sidewall is less than a stiffness of the base wall, the sidewall resisting movement of the bowl toward the second condition until an input force applied to the base wall is equal to or greater than a threshold reaction force of the sidewall directed toward the base wall, and when the input force is equal to or greater than the threshold reaction force the sidewall is configured such that the threshold reaction force is immediately reduced prior to bowl moving toward the second condition,
wherein the sidewall is configured such that the threshold reaction force of the sidewall immediately snaps the bowl from the second condition fully back into the first condition upon removal of the input force from the base wall,
wherein a connection between the open end portion of the bowl and the rim defines a hinge portion for movement of the bowl, and the snap back is amplified by a length of the sidewall and elastic forces of the sidewall, the base wall and the hinge portion.

2. The scoop of claim 1, wherein the sidewall defines a reduced thickness section having a thickness less than a thickness of the base wall.

3. The scoop of claim 2, wherein the reduced thickness section of the sidewall is centrally located between the rim and the base wall.

4. The scoop of claim 2, where in cross-section of the bowl a curvature of the outer surface deviates from a curvature of the inner surface to define the reduced thickness section.

5. The scoop of claim 2, wherein the sidewall is configured such that a stiffness of the sidewall in the reduced thickness section is less than a stiffness of the base wall such that the sidewall resists movement of the bowl toward the second condition until an input force applied to the base wall is equal to or greater than the threshold reaction force of the sidewall directed toward the base wall.

6. The scoop of claim 5, wherein the sidewall is configured to prevent movement of the bowl from the first condition toward the second condition upon an input force applied substantially normal to the reduced thickness section of the sidewall.

7. The scoop of claim 2, wherein the base wall is centered in a bottom of the bowl, the sidewall includes a first section interconnecting the reduced thickness section and the base wall and a second section interconnecting the reduced thickness section and the open end portion of the bowl, each of the first section and the second section has an increasing thickness along a direction from the reduced thickness section toward the respective base wall and the open end portion.

8. The scoop of claim 1, wherein an outer surface of the base wall in the first condition of the bowl is substantially planar and defines a support surface for the bowl, and the outer surface of the base wall in the second condition is inwardly deformed to define a recess and a ridge surrounding the recess.

9. The scoop of claim 1, wherein the sidewall of the bowl is formed of a resilient, elastic first material, and the base wall is formed of a second material having a hardness greater than a hardness of the first material.

10. A scoop comprising:
a rim having an outer surface and an inner surface opposite the outer surface, the inner surface defining an opening extended through the rim; and
a bowl formed of a resilient, elastic material having an open end portion secured to the rim, a connection between the open end portion of the bowl and the inner surface of the rim defines a hinge portion adapted to allow for movement of the bowl relative to the rim between a first, unbuckled condition and a second, buckled condition,
wherein the bowl includes a sidewall and a base wall, the sidewall is configured to resist movement of the bowl toward the second condition until an input force applied directly to the base wall is equal to or greater than a threshold reaction force of the sidewall directed toward the base wall, the sidewall is configured such that when the input force is equal to or greater than the threshold reaction force the threshold reaction force is immediately reduced prior to bowl moving toward the second condition, the sidewall is configured such that continued application of the input force equal to or greater than the threshold reaction force maintains the bowl the second condition, and the sidewall is configured such that removal of the input force from the base wall results in an increasing impulse imparted onto the bowl in a direction of the first condition due to combined reaction forces of the sidewall and the base wall, the bowl immediately snapping fully back to the first condition,
wherein the sidewall is configured such that in the second condition an inner surface of the base wall is located at or beneath an outer edge of the rim,
wherein the hinge portion is adapted to bias the bowl from the second condition back toward the first condition.

11. The scoop of claim 10, wherein the sidewall defines a reduced thickness section having a thickness less than a thickness of the base wall such that a stiffness of the sidewall is less than a stiffness of the base wall.

12. The scoop of claim 11, wherein the reduced thickness section of the sidewall is centrally located between the rim and the base wall, and the base wall is centered in a bottom of the bowl.

13. The scoop of claim 11, wherein the bowl includes a smooth inner surface and an outer surface, and in cross-section of the bowl a curvature of the outer surface deviates from a curvature of the inner surface to define the reduced thickness section.

14. The scoop of claim 11, the sidewall includes a first section interconnecting the reduced thickness section and the base wall and a second section interconnecting the reduced thickness section and the open end portion of the bowl, each of the first section and the second section has an increasing thickness along a direction from the reduced thickness section toward the respective base wall and the open end portion.

15. The scoop of claim 10, wherein the sidewall of the bowl is formed of a resilient, elastic first material, and the base wall is formed of a second material having a hardness greater than a hardness of the first material such that a stiffness of the sidewall is less than a stiffness of the base wall.

* * * * *